(12) United States Patent
Goffinet et al.

(10) Patent No.: US 10,289,703 B1
(45) Date of Patent: May 14, 2019

(54) SYSTEM AND METHODS FOR MULTI-TENANCY MANAGEMENT WITHIN A DISTRIBUTED DATABASE

(71) Applicant: Twitter, Inc., San Francisco, CA (US)

(72) Inventors: Christopher Goffinet, San Francisco, CA (US); Peter Schuller, San Francisco, CA (US); Boaz Avital, San Francisco, CA (US); Armond Bigian, San Francisco, CA (US); Spencer G. Fang, San Francisco, CA (US); Anthony Asta, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/489,461

(22) Filed: Apr. 17, 2017

Related U.S. Application Data

(63) Continuation of application No. 14/612,912, filed on Feb. 3, 2015, now Pat. No. 9,628,404.

(60) Provisional application No. 61/978,689, filed on Apr. 11, 2014.

(51) Int. Cl.
| | |
|---|---|
| *G06F 15/173* | (2006.01) |
| *G06F 17/30* | (2006.01) |
| *H04L 12/927* | (2013.01) |
| *H04L 12/24* | (2006.01) |

(52) U.S. Cl.
CPC .... *G06F 17/30289* (2013.01); *H04L 41/0896* (2013.01); *H04L 41/5067* (2013.01); *H04L 47/805* (2013.01)

(58) Field of Classification Search
USPC ........... 709/226; 370/389; 711/162; 340/10.1
See application file for complete search history.

(56) References Cited

U.S. PATENT DOCUMENTS

| | | | | |
|---|---|---|---|---|
| 5,455,865 | A * | 10/1995 | Perlman | .................. H04L 29/06 370/389 |
| 7,317,967 | B2 * | 1/2008 | DiGianfilippo | ......... A61J 3/002 700/265 |
| 9,628,404 | B1 * | 4/2017 | Goffinet | .............. H04L 41/5067 |
| 2009/0009295 | A1 * | 1/2009 | Rofougaran | ......... H04B 5/0012 340/10.1 |
| 2011/0302577 | A1 | 12/2011 | Reuther | |

(Continued)

OTHER PUBLICATIONS data.linkedin.com, "Apache Helix," (2015). Retrieved from the Internet on Apr. 17, 2015: http://data.linkedin.com/opensource/helix.

(Continued)

*Primary Examiner* — Thanh T Nguyen
(74) *Attorney, Agent, or Firm* — Fish & Richardson P.C.

(57) ABSTRACT

Embodiments are provided for enabling dynamic reallocation of resources in a multi-tenant distributed database. According to certain aspects, a management services module allocates multiple portions of computer resources for respective operation of multiple services by multiple customers. A quality of service (QoS) controller detects that one of the services is attempting to exceed its allocated portion of resources, and identifies an available portion of another allocated portion of resources. In response, the QoS controller causes the management services module to dynamically allocate the available portion to the detected service so that the detected service is able to operate without error or delay.

18 Claims, 13 Drawing Sheets

(56) References Cited

U.S. PATENT DOCUMENTS

2012/0331254 A1* 12/2012 Kezuka ................ G06F 3/0605
    711/162
2018/0321971 A1* 11/2018 Bahramshahry ...... G06F 9/4881
2018/0321975 A1* 11/2018 Bahramshahry ........ G06F 9/505
2018/0321979 A1* 11/2018 Bahramshahry ...... G06F 9/5038

OTHER PUBLICATIONS curator.apache.org, "Welcome to Apache Curator," (2015). Retrieved from the Internet on Apr. 17, 2015: http://curator.apache.org/.

curator.apache.org, "Recipes," (2015). Retrieved from the Internet on Jul. 23, 2015: URL: http://curator.apache.org/curator-recipes/index.html.

curator.apache.org, "Framework," (2015) Retrieved from the Internet on Jul. 23, 2015: http://curator.apache.org/curator-framework/index.html.

curator.apache.org, "Utilities," (2015). Retrieved from the Internet on Jul. 23, 2015: http://curator.apache.org/utilities.html.

curator.apache.org, "Client," (2015). Retrieved from the Internet on Jul. 23, 2015): http://curator.apache.org/curator-client/index.html.

curator.apache.org, "Error Handling," (2015). Retrieved from the Internet on Jul. 23, 2015: http://curator.apache.org/errors.html.

\* cited by examiner

Manhattan | Home | My Applications | Datasets | Help

— 350

Manhattan
Distributed storage at Twitter scale.

What is Manhattan? Manhattan is Core Storage's next generation distributed database that is self-service. We support static datasets generated from Hadoop and dynamic datasets with read-write support. Manhattan makes it easy to get that data in a location where everyone can access it.

[ Get started today ▽ ]

Self-service
Manhattan provides full self-service capabilities that allow you to get started fast and easy.

Alerting
We have direct integration with Koalabird, that means you get to take advantage of Twitter's powerful alerting system for your

Rate Limiting
Set your own rate limits, from read to write qps. This helps reduce bad actors from impacting your application performance.

Multi-datacenter
Stop worrying about how to build applications that support multi-datacenter. Manhattan provides this automatically for

FIG. 3

Manhattan   Home   My Applications   Datasets                                                                                Help

What's your use-case?
We need to collect some information from you to get started. Help us understand your use case.

Static Data ~451
Do you have data that is static and can be generated using the power of Hadoop? Manhattan supports serving this static data out using our read-only clusters.

[ Select Read Only ▼ ]

Dynamic Data ~452
Do you have data that changes dynamically, such data might include tweets, and users? Manhattan supports serving this dynamic data out using our read-write clusters.

[ Select Read/Write ▼ ]

Manhattan    Home    My Applications    Datasets                                                                    Help

Clusters  that exist in the Manhattan ecosystem

Multi-Tenant

These clusters are available to everyone within Twitter to use. They support the ability for multiple customers to run on the same hardware.

| Name | Description | Cluster Type | Datacenters | |
|---|---|---|---|---|
| Adama | This cluster is used for testing only. It's backed by (Solid State Storage) and isn't supposed to be used for production use | testing | smf1, atla, smfd | Select this cluster |
| Athena | This cluster is used for larger datasets (Solid State Storage) that require low-latency and high throughput. This is the recommended cluster | production recommended | smf1, atla | Select this cluster |
| Starbuck | This cluster is used for very small datasets (in-memory) that require low-latency and high throughput. All requests for in-memory storage must go through a manual approval process. | production | smf1, atla | Select this cluster |

Manhattan - New Application

Manhattan  Home  My Applications  Datasets  Reports  Capacity  Mission Control  Help

New Application using the Omega cluster

An application is a single use case that needs access to Manhattan. It can make requests to any dataset in the cluster on which it was created. It can also own its own datasets, which should have data directly related to the feature.

[ Give me an example? ]

General Information

Application Name (ID): [       ]   This is the name of your application, (eg. Metastore), it will act as the application that you will send with every request to Manhattan.

Description: [       ]   Description of your Application (eg: Metadata about users)

Core Hours: [ ◀▶ ]

| Manhattan - New Application |
|---|

Manhattan    Home    My Applications    Datasets    Reports    Capacity    Mission Control    Help

Contact Information

Contact email: [_____]
An email address we can have on file if we need to contact your application for questions.

Oncall email: [_____]
This is an email address that we can send alerts or page (i.e., pagerduty) to ensure operational reliability for your application.

Alert DDS Team: [◄►]
When we create Koalabind alerts for your application we need you to pick your DDS team you would like them created under, so you can snooze alerts if you get paged.

Storage and Throughput Quotas

Storage (gigabytes): [(example: 500)]    [Estimate the size of your data]
How much storage do you need for your application in gigabytes

Peak keys written per second: [(example: 1000)]
This is the how many keys per second you need to write to Manhattan at peak normal traffic combined across all datacenters.

Storage and Throughput Quotas

Storage (gigabytes): [example: 500] [Estimate the size of your data]
How much storage do you need for your application in gigabytes.

Peak keys written per second: [example: 1000]
This is the how many keys per second you need to write to Manhattan at peak normal traffic combined across all datacenters.

Peak partitioning keys read per second: [example: 1000]
This is the how many pkeys per second you need to read from Manhattan at peak normal traffic combined across all datacenters. E.g. if you need 3 key attributes from 100 pkey user ids every second, that's 100 pkeys/s.

Peak local keys read per second: [example: 2000]
This is the how many lkeys per second you need to read from Manhattan as peak normal traffic combined across all datacenters. E.g. if you need 3 key attributes from 100 pkey user ids every second, that's 300 lkeys/s.

Traffic Expectations

Will you be using a cache? [No, all requests go straight to Manhat ▼]

| | | | | | | |
|---|---|---|---|---|---|---|
| Manhattan | Home | My Applications | Datasets | Reports | Capacity | Mission Control |

Manhattan - New Application

Help

Peak local keys read per second: [(example: 2000)]

This is the how many lkeys per second you need to read from Manhattan as peak normal traffic combined across all datacenters. E.g. if you need 3 key attributes from 100 pkey user ids every second, that's 300 lkeys/s. — 558

Traffic Expectations

Will you be using a cache?  [No, all requests go straight to Manhat ▼]

Abnormal spike pkeys read per second: [(example: 10000)]

This is how many pkeys per second you expect you might need from Manhattan across all datacenters during an abnormal event such as a partial cache failure. If you don't anticipate such an event, put the same number as above.

☐ I have latency requirements

☐ I am interested in using Check-And-Set (CAS)

Permissions

FIG. 5D

SYSTEM AND METHODS FOR MULTI-TENANCY MANAGEMENT WITHIN A DISTRIBUTED DATABASE

CROSS-REFERENCE TO RELATED APPLICATIONS

This application is a continuation of and claims benefit to U.S. application Ser. No. 14/612,912, filed Feb. 3, 2015, which claims the benefit of U.S. Provisional Application No. 61/978,689, filed Apr. 11, 2014, both of which are incorporated by reference herein.

FIELD

The present disclosure generally relates to multi-tenant distributed databases and, more particularly, to implementations for managing resource allocation within a multi-tenant distributed database.

BACKGROUND

Distributed database systems include a plurality of storage devices spread among a network of interconnected computers. The distributed database systems typically have greater reliability and availability than parallel database systems, among other benefits. Various internet services, for example social networking services, employ distributed database systems to manage the storage and retrieval of information. Generally, the need to efficiently and accurately read and write data across the database system increases with a greater amount of information, a greater number of users, and stricter latency requirements.

In various conventional non-distributed systems, different tenancy configurations may be employed to manage software access by users or tenants. A single tenant system includes an architecture in which each customer has their own software instance. In contrast, a multi-tenant system includes an architecture that enables multiple customers to use a single software instance. There are benefits and drawbacks to both single tenant and multi-tenant systems. In particular, even though multi-tenant systems may generally be more complex than single tenant systems, multi-tenant systems may realize more cost savings, increase data aggregation benefits, and simplify the release management process, among other benefits. However, the complexity and constraints of existing distributed system frameworks and the complex resource requirements of multi-tenant systems limit the configurability and functionality of multi-tenancy configurations.

Accordingly, there is an opportunity for techniques and frameworks to support multitenant systems within distributed databases. In particular, there is an opportunity for techniques and frameworks to manage resource allocation within multi-tenant systems implemented in distributed databases.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIG. 3 depicts an example user interface associated with a multi-tenant distributed database in accordance with some embodiments.

FIG. 4A depicts an example user interface for configuring services for operation on a multi-tenant distributed database in accordance with some embodiments.

FIG. 4B depicts an example user interface for selecting resources of a multi-tenant distributed database in accordance with some embodiments.

FIGS. 5A-5D depict example user interfaces for initiating a service supported by a multi-tenant distributed database in accordance with some embodiments.

DETAILED DESCRIPTION

According to the present embodiments, a multi-tenant distributed database as well as various built-in systems and methods of managing access thereto are disclosed. The distributed database is a multi-tenant system capable of concurrently serving multiple use cases of multiple customers according to various resource requirements, parameters, and other factors.

According to aspects, the systems and methods may dynamically reallocate resources within the distributed database in response to the detection of various service usage parameters. Initially, the systems and methods may allocate respective portions of the distributed database resources for use by respective customers in operating respective services, whereby the portions may be allocated according to requirements of the respective services without having to build a dedicated system for the customer. However, the actual usage of the services may result in an imbalanced resource allocation, whereby one service may request more resources than are allocated and another service may underutilize its allocation. The systems and methods may identify an available allocated or unallocated resource portion capable of handling the overage, and may dynamically adjust any resource allocation(s) accordingly. Thus, the systems and methods improve existing multi-tenant distributed database frameworks by negating the need for complex resource reconfiguring. Further, the systems and methods enable seamless accommodation of overage requests, thus improving on the need for existing frameworks to outright deny overage requests.

Figure 1A:
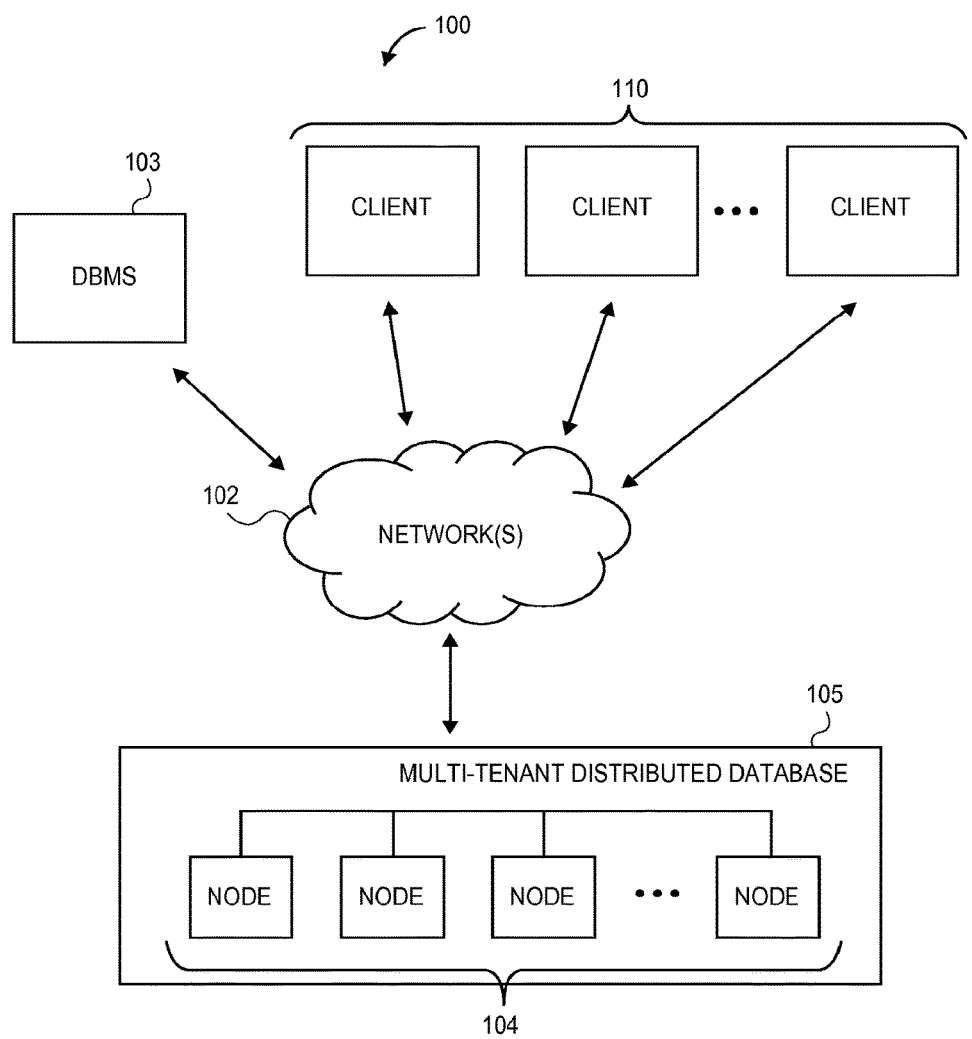
FIG. 1A depicts a system capable of implementing a multi-tenant distributed database in accordance with some embodiments.

FIG. 1A illustrates a general system architecture of a system 100 implementing a multi-tenant distributed database 105. The distributed database 105 may include multiple nodes 104 of storage devices or computer resources that are distributed across a plurality of physical computers, such as a network of interconnected computers. The multiple nodes 104 may be virtually or physically separated, and may be configured to interface with one or more processing units such as one or more CPUs. Each of the nodes 104 may store one or more replicas of one or more datasets, and may include one or more various types of storage devices (e.g., solid state drives (SSDs), platter storage such as hard disk drives, or other memory) and structures (e.g., SSTable, seadb, b-tree, or others). A distributed database management system (DBMS) 103 may be configured to manage the distributed database 105, whereby the DBMS 103 may be stored on a centralized computer within the system 100.

The system 100 further includes a plurality of clients 110 configured to access the distributed database 105 and features thereof via one or more networks 102. It should be appreciated that the network 102 may be any type of wired or wireless LAN, WAN, or the like. For example, the network 102 may be the Internet, or various corporate intranets or extranets. In embodiments, each of the plurality of clients 110 is a dedicated computer machine, workstation, or the like, including any combination of hardware and software components. Further, a user such as a developer, engineer, supervisor, or the like (generally, a "customer") may interface with any of the plurality of clients 110 to access the distributed database 105 and configure various services to be supported thereon. It should be appreciated that the plurality of clients 110 may also interface with the DBMS 103.

Figure 1B:
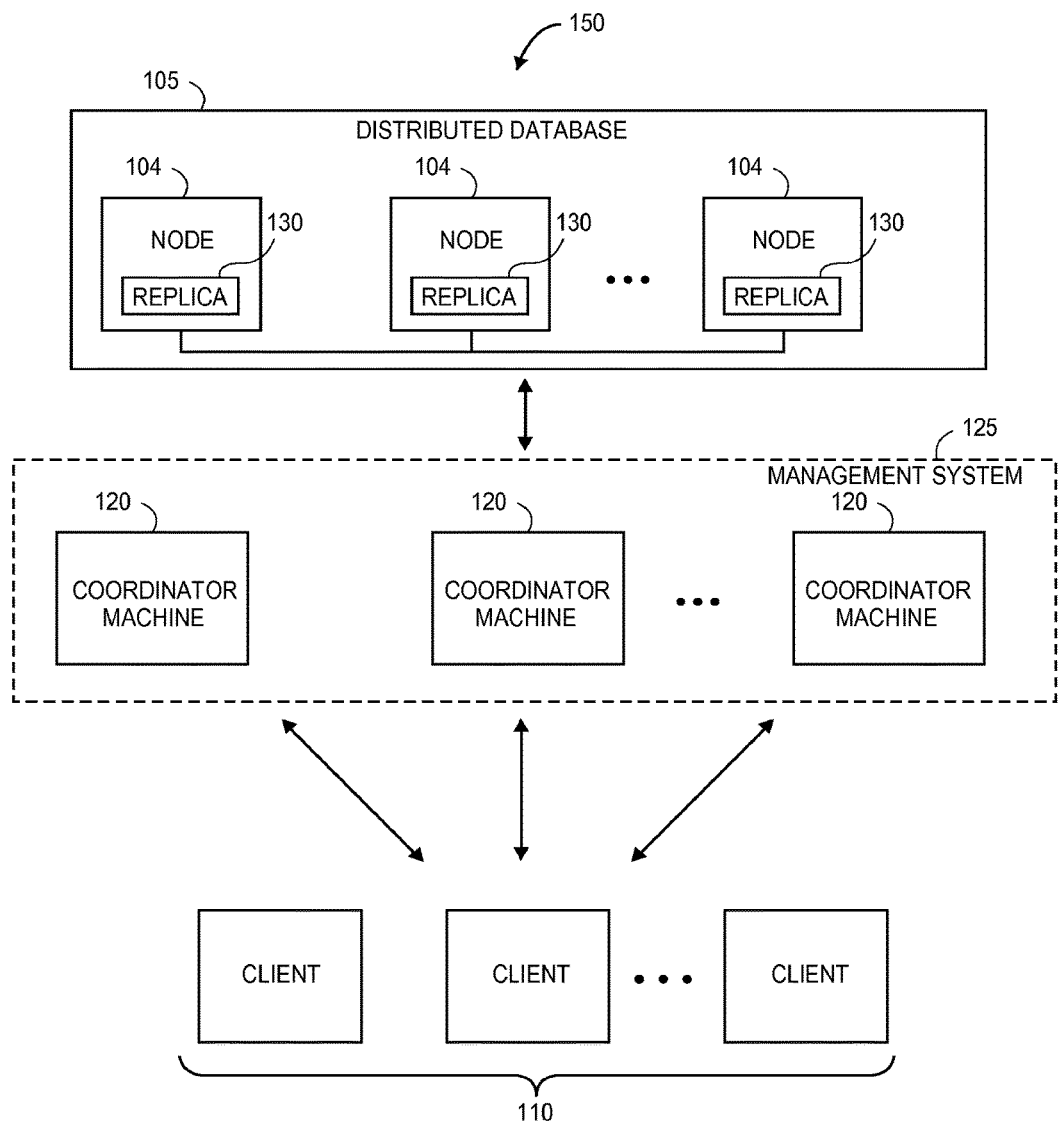
FIG. 1B depicts a detailed representation of various components configured to manage a multi-tenant distributed database in accordance with some embodiments.

FIG. 1B illustrates a system 150 having components capable of implementing the systems and methods of the present embodiments. The system 150 includes the distributed database 105 storing a plurality of nodes 104, as discussed with respect to FIG. 1A. Each of the nodes 104 may store one or more replica representations 130 of one or more datasets.

The system 150 further includes a management system 125, which may serve as or be separate from the DMBS 103 as discussed with respect to FIG. 1A. The management system 125 includes a plurality of coordinator machines 120 that may be distributed throughout various physical or virtual locations and may be configured to connect to one another. Each of the coordinator machines 120 may manage various services associated with storing and managing datasets within the distributed database 105. In one case, each of the coordinator machines 120 may manage one or more services to identify appropriate replica representations 130 and interface with the identified replica representations 130 for dataset storage and management. Customers may operate one or more of the clients 110 to interface with one or more of the coordinator machines 120, where the particular coordinator machine 120 is selected based on availability or other factors.

Figure 1C:
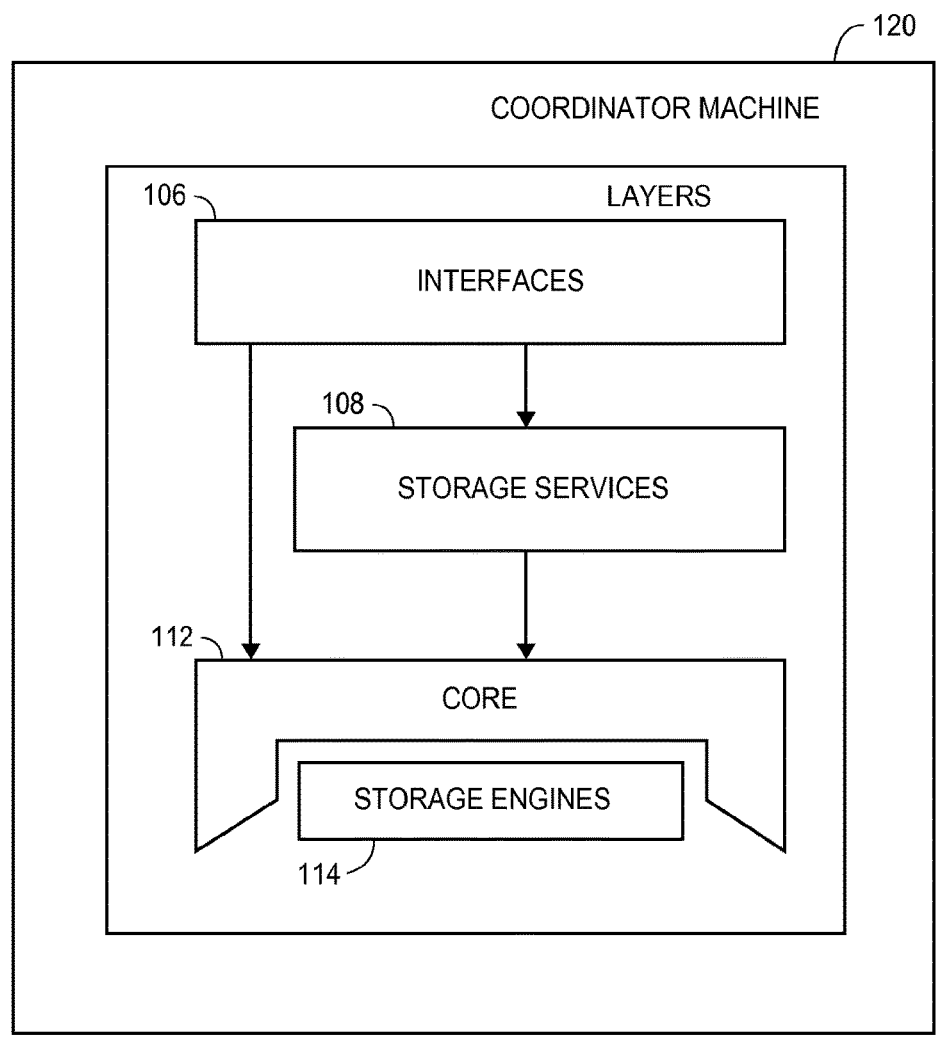
FIG. 1C depicts a representation of various layers supported by a coordinator machine in accordance with some embodiments.

FIG. 1C illustrates a more detailed representation of the coordinator machine 120 and various features that the coordinator machine 120 is capable of supporting or managing. Although only one coordinator machine 120 is depicted in FIG. 1C, it should be appreciated that each of the coordinator machines 120 of the management system 125 may include the same components and support the same services. As illustrated in FIG. 1C, the coordinator machine 120 supports four layers: an interfaces layer 106, a storage services layer 108, a core layer 112, and a storage engines layer 114.

Generally, the core layer 112 is configured to manage or process failure events, consistency models within the distributed database 105, routing functionality, topology management, intra- and inter-datacenter replication, and conflict resolution. The storage engines layer 114 is configured to convert and/or process data for storage on various physical memory devices (e.g., SSD, platter storage, or other memory). The storage services layer 108 supports applications or features that enable customers to manage the importing and storage of data within the distributed database 105. For example, some of the applications or features include batch importing, managing a strong consistency service, and managing a timeseries counters service. The interfaces layer 106 manages how customers interact with the distributed database 105, such as customers interacting with the distributed database 105 via the clients 110.

Figure 2:
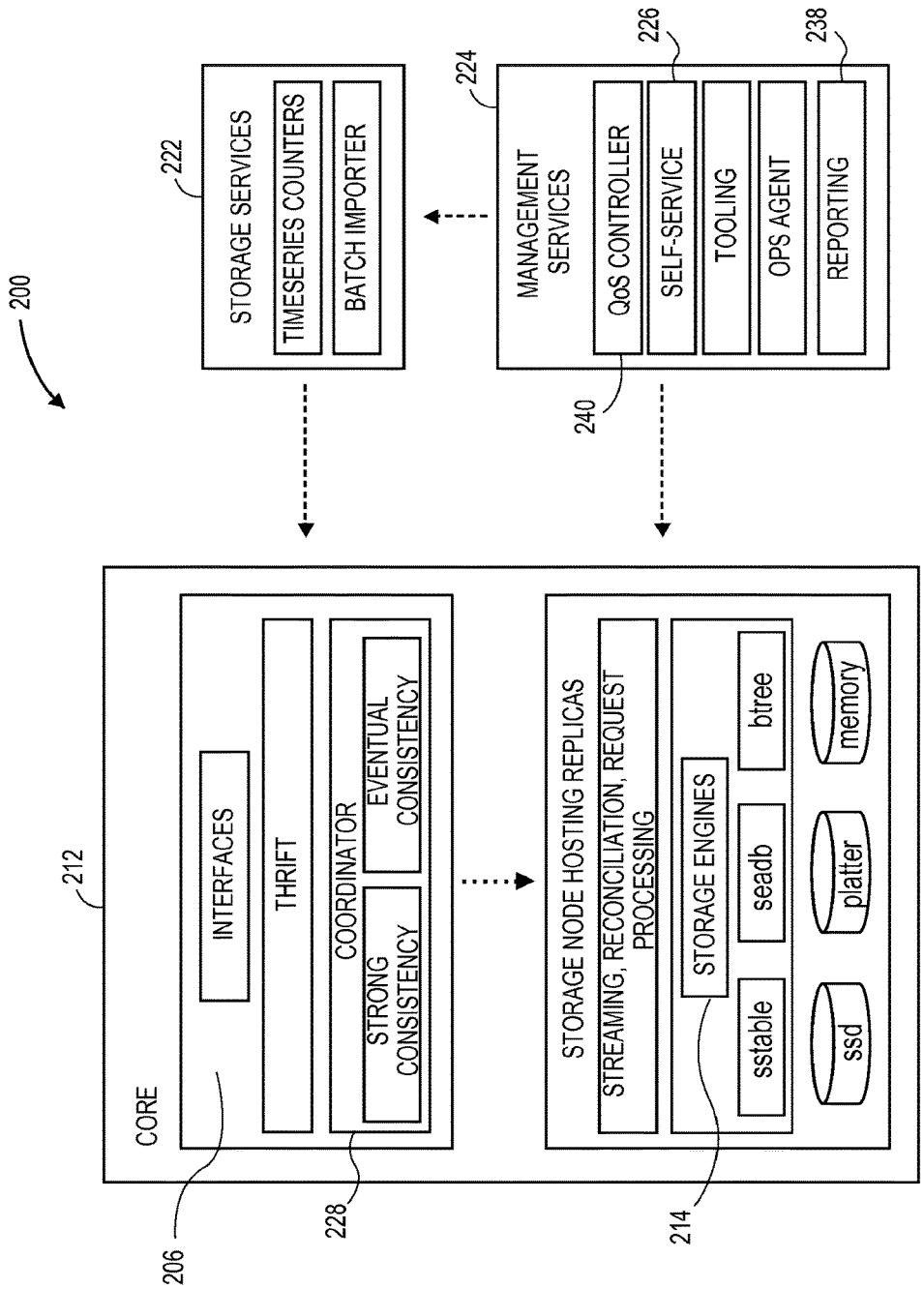
FIG. 2 depicts an example representation of entities and components associated with managing services of a multi-tenant distributed database in accordance with some embodiments.

FIG. 2 illustrates an example representation 200 of various applications and functionalities related to the distributed database system. The applications and functionalities may be managed by the coordinator machines 120 as described with respect to FIGS. 1B and 1C. In particular, the representation 200 identifies various modules managed by each of the coordinator machines 120, as well as communication paths among the modules, the layers, and the storage components associated with the distributed database system.

As illustrated in FIG. 2, the representation 200 includes a core layer 212 (such as the core layer 112 as discussed with respect to FIG. 1B), a storage services module 222, and a management services module 224. The core layer 212 may communicate with an interfaces layer 206 (such as the interfaces layer 106 as discussed with respect to FIG. 1B) and a storage engines layer 214 (such as the storage engines layer 114 as discussed with respect to FIG. 1B). The management services module 224 is configured to communicate with the core layer 212, and includes various components, applications, modules, or the like that facilitate various systems and methods supported by the distributed database system. The storage services module 222 is also configured to communicate with the core layer 212, and also includes various components, applications, modules, or the like that facilitate additional systems and methods supported by the distributed database system.

The storage engines layer 214 is configured to manage data storage on the distributed database as well as maintain data structures in memory. The storage engine layer 214 supports at least three different storage engines: (1) seadb, which is a read-only file format for batch processed data (e.g., from a distributed system such as Apache Hadoop), (2) SSTable, a log-structured merge (LSM) tree-based format for heavy write workloads, and (3) b-tree, ab-tree based format for heavy read and light write workloads. Customers may directly or indirectly select an appropriate storage engine for processing datasets based on the service or use-case of the service.

For example, if the dataset is static and/or can be generated using a distributed system, the customer may want to select a read/only selection corresponding to the seadb storage engine. For further example, in the Twitter® social networking service, if the dataset changes dynamically, such as if the dataset includes tweets and Twitter® users, then the customer may want to select a read/write selection corresponding to the SS Table orb-tree storage engine. Generally, the b-tree storage engine is a better choice for a lot of data writes and the SSTable storage engine is a better choice for a lot of data reads. The management services module 224 initiates an appropriate workflow based on the selected storage engine. The management services module 224 further supports multiple types of clusters for storing datasets: a first, general cluster for storing general data as well as a second, production cluster for storing sensitive data.

The management services module 224 may further include a reporting module 238 configured for various reporting functionalities. The reporting module 238 may support an integration between the datasets being stored and external services and teams, and may enable the automatic reporting of certain usage of the distributed database system to the external services and teams. According to some embodiments, the reporting module 238 may support an API to a "capacity team," or a team tasked with managing the capacity of the distributed database system (generally, a moderator), such that the capacity team may manage customer usage, model capacity metrics, and collect raw data for customers. By managing the capacity of the system, the capacity team may effectively and efficiently manage the associated resources of the distributed database system. In some embodiments, the reporting module 238 may generate reports associated with data usage resulting from consistency model management.

In operation, if a customer creates, tests, or otherwise uses a service and the usage amount exceeds an amount of resources allocated to the customer, the management services module 224 places the service into a pending state and causes the reporting module 238 to automatically generate a service ticket that indicates the service's usage or requested usage, and provide the service ticket to the capacity team. The capacity team may examine the service ticket and interface with the customer to handle or manage the usage request. In particular, the capacity team may approve the increased capacity and enable the service use by the customer, or may reject the increased capacity.

The reporting module 238 may also generate a report if a customer's service exceeds a quota or threshold, along with details of the excess usage. The reporting module 238 may aggregate the reports such that, over time, the capacity team may analyze the usage data to generate resource planning recommendations. For example, the data from the aggregated reports may indicate that more resources are needed to support the excess usage requests.

The management services module 224 further supports a "self-service" interface module 226 that enables customers to configure services or applications within the distributed database, as well as configure various functionalities related thereto, such as consistency model configurations. In particular, the self-service interface module 226 enables a customer to make selections, via various user interfaces, associated with initiating various services and applications supported by the distributed database as well as managing data stored in the distributed database. A customer may interface with the self-service interface module 226 via the user interface which the self-service interface module 226 may cause to be displayed on one of the plurality of clients 110 as discussed with respect to FIG. 1.

Generally, a customer may initiate various services or applications having associated use cases within the distributed database. FIG. 3 illustrates an example "start screen" 350 that details various options and features available to customers for using the distributed database. In another example, as illustrated in an interface 450 of FIG. 4A, the customer may select whether the use case of a desired service is associated with static data (451) or dynamic data (452). Based on the selection of static data or dynamic data, the management services module 224 may need to configure different consistency models and/or different clusters within the distributed database for the desired service.

FIG. 4B illustrates an additional interface 550 associated with initiating a service. In particular, the interface 550 of FIG. 4B indicates various clusters of the distributed database that are available for multi-tenant use. The interface 550 includes a name of the cluster, a description of the cluster, a type of the cluster (e.g., testing, production, etc.), identifications of one or more data centers that support the cluster, and an option for the customer to select a particular cluster.

FIG. 5A illustrates an interface 552 associated with configuring a new application or service that will utilize a specific cluster (such as one of the clusters depicted in FIG. 4B). The interface 552 enables a customer to input a name and description for the application. Similarly, an interface 554 illustrated in FIG. 5B enables the customer to input contact information as well as associate a team of engineers with the application. FIG. 5C illustrates an interface 556 that enables the customer to input various storage and throughput quotas for the application, such as storage space, peak keys written per second, peak partitioning keys read per second, and peak local keys read per second. It should be appreciated that additional storage and throughput quota parameters are envisioned. Moreover, an interface 558 as illustrated in FIG. 5D enables the user to input traffic expectations for the application, such as whether the application will utilize a cache, and keys per second expectations. It should be appreciated that the interfaces 552, 554, 556, 558 of FIGS. 5A-5D are merely examples and that additional or alternative options, selections, and/or content are envisioned.

The self-service interface module 226 further enables the customer to select various functionalities associated with dataset management using the distributed database. In one particular case, the customer can select a rate limiting functionality to set rate limits (e.g., limits on queries per second) associated with data reads and/or data writes, which is described in further detail below. Further, the customer can configure custom alerts associated with meeting or exceeding rate limits. Still further, the customer can select to have reports detailing resource usage and other metrics generated (e.g., by the reporting module 238) at various time intervals or in response to various triggers. Moreover, the self-service interface can enable customers to modify certain parameters (e.g., increase or decrease resource usage limits) after a service is initiated.

The self-service interface module 226 further enables the customer to select various consistency model configurations for a service. In general, distributed systems support a specific consistency model. When data is stored in a distributed system, the data must propagate among multiple computer resources or clusters before it has achieved replica convergence across the distributed system. Certain consistency models have benefits and drawbacks when compared to other consistency models. As discussed herein, an eventually consistent database enables users to store and retrieve data without delay. However, because there is no delay in retrieving data, there is not a guarantee that the retrieved data is completely up-to-date (i.e., is consistent across the distributed system). In contrast, a strongly consistent database requires that all resources or clusters have the same view of stored data. Accordingly, when a user retrieves certain data, that data is guaranteed to be up-to-date, though with a higher read latency, a lower read throughput, and the potential for more failures.

For most tasks and applications supported by a given service, having an eventually consistent database is sufficient. For example, a user of the Twitter® social networking service may not want a long delay when opening the "tweet stream" associated with his or her account, but also may not mind (or may not notice) that at least one Tweet® posted to Twitter® in the last fractions of a second are not presented in the tweet stream. However, there may be some tasks in which a strongly consistent database is preferred. For example, Twitter® may require a strongly consistent database when storing Twitter® handles (i.e., usernames) so as to ensure that the same handle will not be assigned to multiple end users.

Referring back to FIG. 2, the interface layer 206 supports a coordinator module 228 that is configured to interface with the management services module 224 and manage consistency models within the distributed database system. In particular, a customer may interface with the self-service interface module 226 to specify the consistency model as well as various customization and configuration features associated therewith, for different applications and services to be supported by the distributed database system. The interface layer 206 may therefore enable the customer to input a consistency model configuration including various parameters such as consistency type, associated time periods, and associated replication factors.

To support multiple services and multiple consistency models associated therewith, the distributed database enables multiple customers to use the same resources or cluster, whereby each customer is allotted a certain amount of the resources or cluster. In some scenarios, a customer may actually need more resources than what is originally envisioned by the customer and/or what is originally allocated to the customer. A conventional system having resources dedicated for individual customer use would reject a request for resource capacity that exceeds the originally allocated amount. However, because a multi-tenant system concurrently supports multiple use cases for multiple customers, it is likely that one or more of the customers is below a corresponding allocated capacity at a given time. Accordingly, the management services module 224 supports a rate-limiting service operated by a QoS controller 240 to manage customer usage of the resources or clusters of the distributed database across many metrics and ensure that no one service affects others on the system. In particular, the rate-limiting service may limit usage by certain of the customers and, in some cases, dynamically reallocate certain resources for certain of the customers to effectively utilize the total amount of resources or clusters within the distributed database.

As an example, assume that the distributed database is supporting ten (10) customers for various use cases. Each of the ten (10) customers has a corresponding allocated amount of resources whereby a sum of all of the allocated amount of resources may constitute the total resource capacity of the distributed database. Assume that two of the customers are each requesting access to an amount of resources that exceeds their respective allocated amounts. In this scenario, the QoS controller 240 may compare the amount of resources needed to support the outstanding requests (i.e., a sum of the resources needed to support requests of all of the customers) to the total resource capacity to determine whether there is any available resource capacity. If there is available capacity, then at least one of the customers is not using a respective amount of resources allocated to that customer. Accordingly, to maximize the total resource capacity of the system, the QoS controller 240 can allocate a portion of the unused resources for use by the two customers according to the access requests. In contrast, if there is not available capacity, then the QoS controller 240 may reject the requests for the excess resource usage.

The QoS controller 240 is capable of distinguishing among various properties of allocated resources, and managing allocations and requests relating thereto. In particular, various properties of resources may include storage space, network bandwidth, CPU usage, and others. As an example, a customer may request a limit of 1,000 queries per second, but in operation only send 100 queries per second. However, the amount of data per query may be very large and more than what the QoS controller 240 is expecting, such that the total amount of information completely saturates the network bandwidth for the resources allocated to the customer. In some cases, the QoS controller 240 may dynamically manage (e.g., rate limit) the allocated resources according to the network bandwidth of the queries even though the original request specified an amount of queries without indicating a corresponding data transmission amount. In other cases, the QoS controller 240 may identify an available portion of additional allocated resources capable of supporting the queries, and may dynamically reallocate the available portion to support the overage network bandwidth (thus negating the need to rate limit or deny the overage request).

After a customer specifies the parameters for a service via the various interfaces, the QoS controller 224 determines whether the required amount of resources of the distributed database are available to support the service. If the required amount of resources are available, the QoS controller 224 instantiates the resources and enables the service to access the resources, whereby the coordinator module 228 manages the corresponding resources of the distributed database according to the configured consistency model. Of course, the customer can request additional resources for a particular application which the QoS controller 224 may additionally configure or instantiate.

Figure 6:
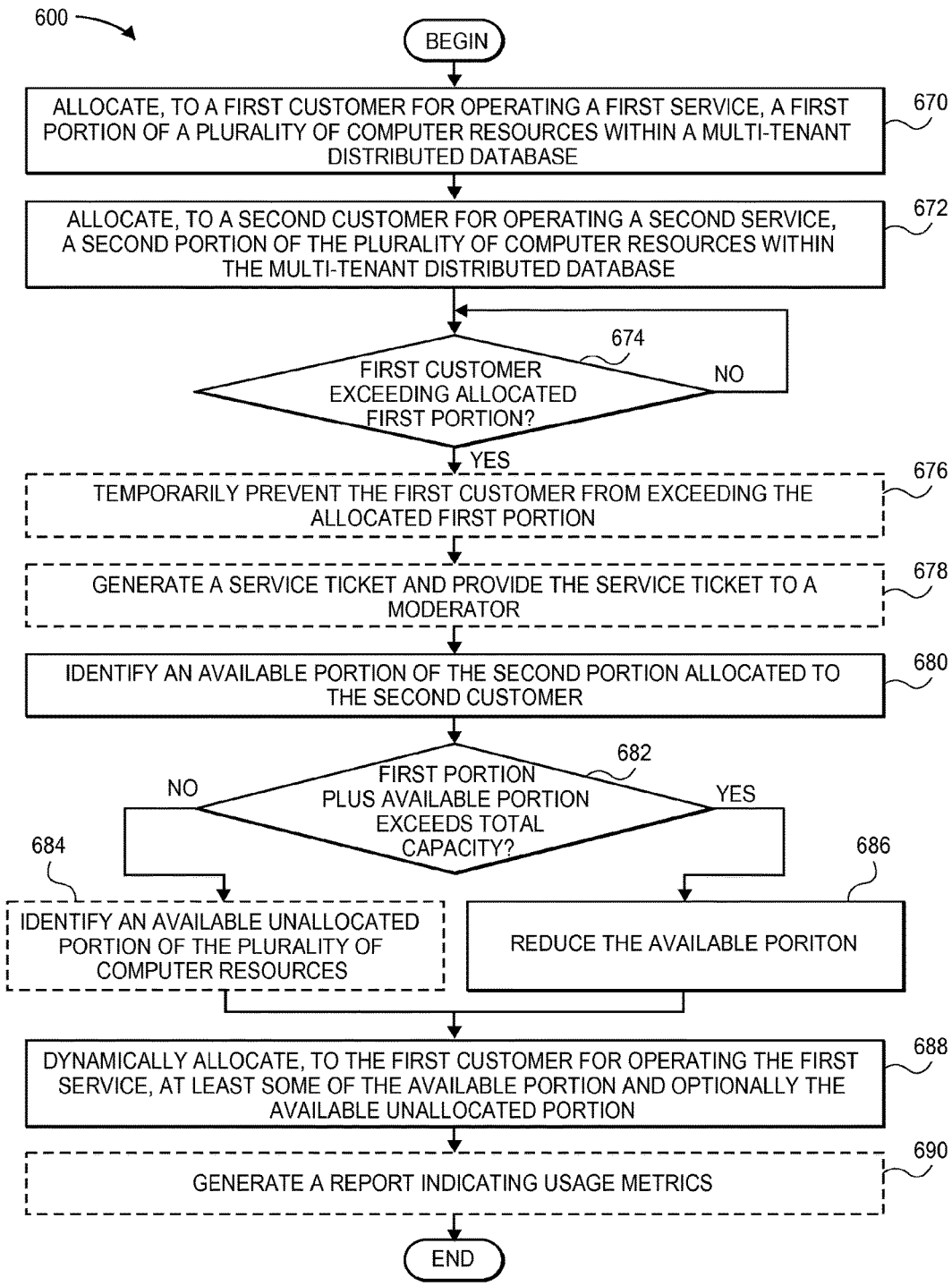
FIG. 6 depicts a flow chart of an example method for configuring a consistency model for a service supported by a multi-tenant distributed database in accordance with some embodiments.

FIG. 6 is a flowchart of a method 600 for an electronic device to manage resource usage by a plurality of customers within a multi-tenant distributed database. It should be appreciated that the electronic device may correspond to one or more of the various modules or entities, or combinations thereof, discussed herein. For example, one of the coordinator machines 120, or more specifically the management services module 224, may implement and facilitate the method 600. The order of the steps of the depicted flowchart of FIG. 6 can differ from the version shown, and certain steps can be eliminated, and/or certain other ones can be added, depending upon the implementation. According to embodiments, a customer may interface (e.g., via the self-service interface 226) with the electronic device to specify parameters for a service as well as consistency model configurations for the service.

The method 600 begins with the electronic device allocating (670), to a first customer for operating a first service, a first portion of a plurality of computer resources within a multitenant distributed database. Similarly, the electronic device may allocate (672), to a second customer for operating a second service, a second portion of a plurality of computer resources within the multi-tenant distributed database. In some implementations, each of the first customer and the second customer may submit a request (e.g., via a self-service user interface) for operation of the respective first and second services, along with parameters associated with service operation such as storage space, peak keys written per second, peak partitioning keys read per second, peak local keys read per second, and/or others. The electronic device may accordingly identify or calculate the first and second portions based on respective amounts of resources needed to support the respective first and second services and the parameters thereof.

In allocating the first and second portions (and optionally any additional portions), the electronic device may allocate the entirety of the plurality of computer resources, or may leave a portion of the plurality of computer resources unallocated. In other embodiments, the electronic device may over-allocate the plurality of computer resources, such as by allocating a single portion of the plurality of computer resources for operation of each of the first service and the second service. After the resource allocation, the first and second customers may operate the respective first and second services within the respective first and second allocated portions.

During operation of the first and second services, either the first customer or the second customer may exceed the respective resources of the first portion or the second portion. Accordingly, the electronic device may determine (674) whether the first customer (or the second customer), in operating the first service (or the second service), has exceeded the allocated first portion (or allocated second portion). In some implementations, the electronic device may detect when operation of either the first service or the second service is approaching the respective resource limit of the first portion or the second portion, or otherwise within a threshold amount or percentage of the respective resource limit. For example, if the first service is allocated with 2 terabytes (TB) of storage and, during operation of the first service, the first service has used 1.9 TB of storage (i.e., within 5% or 0.1 of the 2 TB limit), then the electronic device detects that the resource usage is within a threshold amount or percentage.

If the electronic device determines that the first customer is not exceeding the allocated first portion ("NO"), the electronic device may continue to monitor resource usage. In contrast, if the electronic device determines that the first customer is exceeding the allocated first portion ("YES"), the electronic device may optionally temporarily prevent (676) the first customer from exceeding the allocated first portion or otherwise rate limit operation of the first service. In particular, the electronic device may prevent or deny whatever operation the first service is attempting that would result in the exceeding of the allocated first portion (or would result in the exceeding of any threshold or limit). The electronic device may also optionally generate (678) a service ticket and provide the service ticket to a moderator. The service ticket may indicate any resource usage as well any instance of the allocated first portion being exceeded or an attempt to exceed the allocated first portion. The moderator may choose to take various actions depending on the content of the service ticket.

To accommodate the increased resource need, the electronic device may identify (680) an available portion of the second portion allocated to the second customer. In particular, during current operation of the second service, the second customer may not be using the full resource allocation of the second portion and thus there may be an unused or available portion of the second portion.

The electronic device may determine (682) whether a combination of the first portion and the available portion exceeds the total capacity of the plurality of computer resources. In implementations, if the combination exceeds the total capacity ("YES"), then the plurality of computer resources may be over-allocated, and the electronic device may reduce (686) the available portion by removing or otherwise not including some of the resources from or in the available portion. In particular, the electronic device may determine a portion of the available portion that would not result in the plurality of computer resources being over-allocated. If the combination does not exceed the total capacity ("NO"), the electronic device may optionally identify (684) an available unallocated portion of the plurality of computer resources. The available unallocated portion may be in addition to the available portion of the second portion. Further, the electronic device may identify the available unallocated portion in various instances such as if the available portion of the second portion is not sufficient to support the exceeded allocated first portion. For example, if the electronic device determines that resources are needed to support 1,000 additional queries per second and the available portion of the second portion is able to support 800 queries per second, then the electronic device may additionally identify an unallocated portion capable of supporting the extra 200 queries per second. Thus, the electronic device may determine the total available resources to be the available portion of the second portion plus at least some of the available unallocated portion.

After the electronic device identifies and optionally modifies (e.g., by reducing) the available portion of the second portion, the electronic device may dynamically allocate (688), to the first customer for operating the first service, at least some of the available portion. Additionally, the electronic device may optionally allocate the available unallocated portion to the first customer for operating the first service. As a result, the first customer, in operating the first service, is able to exceed the allocated first portion without being subject to a service denial or to rate limiting. In an optional embodiment, the electronic device may generate (690) a report indicating usage metrics associated with each computer resource included in at least one of the first portion and the second portion, and provide the report to a moderator associated with the multi-tenant distributed database for usage analysis. The electronic device may also periodically update the report to indicate updated usage metrics according to operation of the first service and/or second service within the multi-tenant distributed database.

Figure 7:
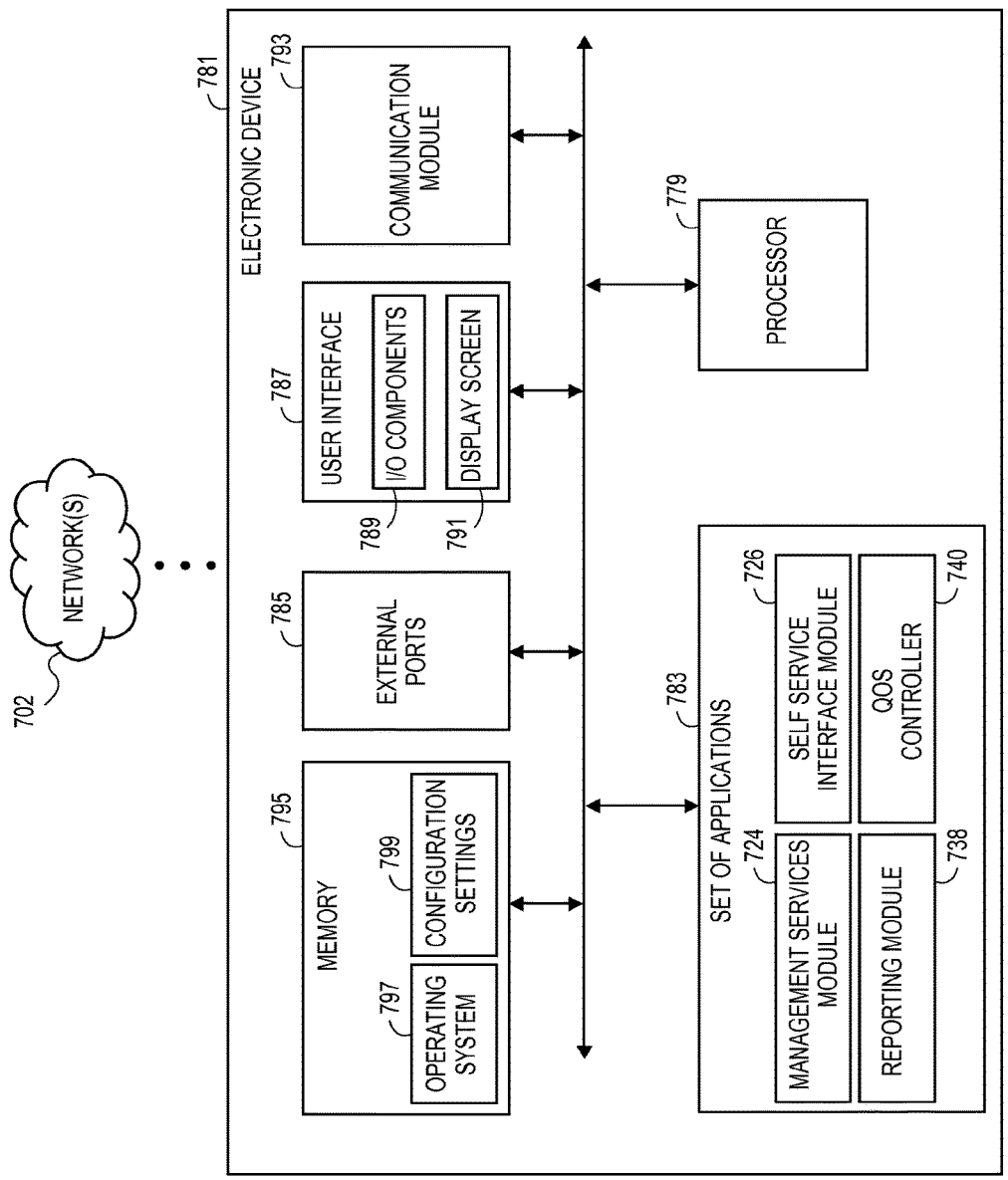
FIG. 7 depicts a hardware diagram of an electronic device in accordance with some embodiments.

FIG. 7 illustrates an example electronic device 781 in which the functionalities as discussed herein may be implemented. In some embodiments, the electronic device 781 may be one of the coordinator machines 120 and/or one of the clients 110 as discussed with respect to FIG. 1B. Generally, the electronic device 781 is a dedicated computer machine, workstation, or the like, including any combination of hardware and software components.

The electronic device 781 can include a processor 779 or other similar type of controller module or microcontroller, as well as a memory 795. The memory 795 can store an operating system 797 capable of facilitating the functionalities as discussed herein. The processor 779 can interface with the memory 795 to execute the operating system 797 and a set of applications 783. The set of applications 783 (which the memory 795 can also store) can include a self-service interface module 726 configured to facilitate the customer interaction functionalities as discussed herein, a management services module 724 configured to facilitate resource allocation, a reporting module 738 configured to facilitate reporting functionalities, and a QoS controller 740 configured to manage reallocation of the resources in a multi-tenant distributed database. It should be appreciated that the set of applications 783 can include one or more other applications or modules not depicted in FIG. 7.

Generally, the memory 795 can include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 781 can further include a communication module 793 configured to interface with one or more external ports 785 to communicate data via one or more networks 702. For example, the communication module 793 can leverage the external ports 785 to establish a wide area network (WAN) or a local area network (LAN) for connecting the electronic device 781 to other components such as resources of a distributed database. According to some embodiments, the communication module 793 can include one or more transceivers functioning in accordance with IEEE standards, 3GPP standards, or other standards, and configured to receive and transmit data via the one or more external ports 785. More particularly, the communication module 793 can include one or more wireless or wired WAN and/or LAN transceivers configured to connect the electronic device 781 to WANs and/or LANs.

The electronic device 781 may further include a user interface 787 configured to present information to the user and/or receive inputs from the user. As illustrated in FIG. 7, the user interface 787 includes a display screen 791 and I/O components 789 (e.g., capacitive or resistive touch sensitive input panels, keys, buttons, lights, LEDs, cursor control devices, haptic devices, and others).

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 779 (e.g., working in connection with the operating system 797) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A computer-implemented method for managing resource usage by a plurality of customers within a multi-tenant distributed database, the method comprising:
   receiving parameters for a service from a first customer;
   allocating, based on the received parameters, a portion of a plurality of computer resources associated with the multi-tenant distributed database to support the service of the first customer;
   during operation of the service, determining that the computer resources allocated to support the service of the first customer satisfy one or more specified conditions;
   in response to the determination, identifying an available portion of the plurality of computer resources, wherein the available portion includes an unused portion allocated to one or more second customers;
   determining whether a combination of the portion allocated to support the service of the first customer and the available portion exceeds a total capacity of the plurality of computer resources indicative of over-allocation of computing resources;
   in response to determining that the combination exceeds the total capacity, reducing the available portion for dynamic allocation; and
   allocating, to the first customer for operating the first service, at least some of the available portion.

2. The computer-implemented method of claim 1, wherein determining that the computer resources satisfy one or more specified conditions includes determining that the first customer, in operating the first service, is using an amount of the portion of the allocated computer resources that is approaching a specified resource limit.

3. The computer-implemented method of claim 1, wherein determining that the computer resources satisfy one or more specified conditions includes determining that the first customer is using an amount of computer resources that exceeds the allocated portion.

4. The computer-implemented method of claim 3, wherein in response to determining that the first customer is using an amount of computer resources that exceeds the allocated portion, temporarily preventing the first customer from exceeding the allocated portion or applying a rate limit for operating the first service, until at least some of the available portion is allocated to the first customer.

5. The computer-implemented method of claim 1, wherein the available portion of the plurality of computer resources includes an unallocated portion of the plurality of computer resources.

6. The computer-implemented method of claim 5, wherein allocating, to the first customer for operating the first service, at least some of the available portion comprises:
   allocating, to the first customer for operating the first service, the unallocated portion of the computer resources and at least some of the unused portion allocated to one or more second users.

7. A system comprising:
   a multi-tenant distributed database including a management services module, the management services module including one or more processor configured to perform operations comprising:
   receiving parameters for a service from a first customer;
   allocating, based on the received parameters, a portion of a plurality of computer resources associated with a multi-tenant distributed database to support the service of the first customer;
   during operation of the service, determining that the computer resources allocated to support the service of the first customer satisfy one or more specified conditions;
   in response to the determination, identifying an available portion of the plurality of computer resources, wherein the available portion includes an unused portion allocated to one or more second customers;
   determining whether a combination of the portion allocated to support the service of the first customer and the available portion exceeds a total capacity of the plurality of computer resources indicative of over-allocation of computing resources;

in response to determining that the combination exceeds the total capacity, reducing the available portion for dynamic allocation; and allocating at least some of the available portion to support the service of the first customer.

8. The system of claim 7, wherein determining that the computer resources satisfy one or more specified conditions includes determining that the first customer is using an amount of the portion of the allocated computer resources that is approaching a specified resource limit.

9. The system of claim 7, wherein determining that the computer resources satisfy one or more specified conditions include determining that the first customer is using an amount of computer resources that exceeds the allocated portion.

10. The system of claim 9, wherein in response to determining that the first customer is using an amount of computer resources that exceeds the allocated portion, temporarily preventing the first customer from exceeding the allocated portion or applying a rate limit operation to the service until at least some of the available portion is allocated to the first customer.

11. The system of claim 7, wherein the available portion of the plurality of computer resources includes an unallocated portion of the computer resources.

12. The system of claim 11, wherein allocating at least some of the available portion includes allocating the unallocated portion of the computer resources and at least some of the unused portion allocated to one or more second customers.

13. One or more computer storage media including instructions that, when executed by one or more processors, perform operations comprising:

receiving parameters for a service from a first customer;

allocating, based on the received parameters, a portion of a plurality of computer resources associated with a multi-tenant distributed database to support the service of the first customer;

during operation of the service, determining that the computer resources allocated to support the service of the first customer satisfy one or more specified conditions;

in response to the determination, identifying an available portion of the plurality of computer resources, wherein the available portion includes an unused portion allocated to one or more second customers;

determining whether a combination of the portion allocated to support the service of the first customer and the available portion exceeds a total capacity of the plurality of computer resources indicative of over-allocation of computing resources;

in response to determining that the combination exceeds the total capacity, reducing the available portion for dynamic allocation; and allocating at least some of the available portion to support the service of the first customer.

14. The one or more computer storage media of claim 13, wherein determining that the computer resources satisfy one or more specified conditions includes determining that the first customer is using an amount of the portion of the allocated computer resources that is approaching a specified resource limit.

15. The one or more computer storage media of claim 13, wherein determining that the computer resources satisfy one or more specified conditions include determining that the first customer is using an amount of computer resources that exceeds the allocated portion.

16. The one or more computer storage media of claim 15, wherein in response to determining that the first customer is using an amount of computer resources that exceeds the allocated portion, temporarily preventing the first customer from exceeding the allocated portion or applying a rate limit operation to the service until at least some of the available portion is allocated to the first customer.

17. The one or more computer storage media of claim 13, wherein the available portion of the plurality of computer resources includes an unallocated portion of the computer resources.

18. The one or more computer storage media of claim 17, wherein allocating at least some of the available portion includes allocating the unallocated portion of the computer resources and at least some of the unused portion allocated to one or more second customers.

* * * * *